(12) United States Patent
Haulick et al.

(10) Patent No.: US 10,326,867 B2
(45) Date of Patent: Jun. 18, 2019

(54) MEASUREMENT AND TUNING OF HANDS FREE TELEPHONE SYSTEMS

(75) Inventors: Tim Haulick, Blaubeuren (DE); Guido Kolano, Salach (DE); Martin Roessler, Ulm (DE); Hans-Joerg Koepf, Ulm (DE); Walter Schnug, Memmingen (DE); Markus Buck, Biberach (DE)

(73) Assignee: Nuance Communications, Inc., Burlington, MA (US)

( * ) Notice: Subject to any disclaimer, the term of this patent is extended or adjusted under 35 U.S.C. 154(b) by 1087 days.

(21) Appl. No.: 13/518,404

(22) PCT Filed: Feb. 5, 2010

(86) PCT No.: PCT/US2010/023261
§ 371 (c)(1),
(2), (4) Date: Jun. 22, 2012

(87) PCT Pub. No.: WO2011/096927
PCT Pub. Date: Aug. 11, 2011

(65) Prior Publication Data
US 2012/0278041 A1  Nov. 1, 2012

(51) Int. Cl.
*H04M 1/24* (2006.01)

(52) U.S. Cl.
CPC .................... *H04M 1/24* (2013.01)

(58) Field of Classification Search
CPC ........................................... H04M 1/24
USPC ............ 455/423, 67.11, 67.12, 67.14, 115.1, 455/115.2, 226.1, 569.1, 569.2; 379/29.02
See application file for complete search history.

(56) References Cited

U.S. PATENT DOCUMENTS

| 6,611,595 | B1 | 8/2003 | Leckschat et al. | |
|---|---|---|---|---|
| 8,433,953 | B1* | 4/2013 | Gaudette | G06F 11/263 702/123 |
| 2003/0069010 | A1* | 4/2003 | Eravelli | H04W 24/00 455/423 |
| 2003/0130005 | A1* | 7/2003 | Weisshaar | H04W 48/14 455/525 |
| 2004/0198347 | A1* | 10/2004 | Roux | H04B 7/18508 455/431 |
| 2005/0125211 | A1* | 6/2005 | Nahata | G06F 8/20 703/13 |

(Continued)

FOREIGN PATENT DOCUMENTS

| EP | 2 296 356 A2 | 3/2011 |
|---|---|---|
| JP | 2004 282419 A | 10/2004 |

(Continued)

OTHER PUBLICATIONS

International Search Report, PCT/US2010/023261, dated Oct. 20, 2010, 4 pages.

(Continued)

*Primary Examiner* — Kamran Afshar
*Assistant Examiner* — Farid Seyedvosoghi
(74) *Attorney, Agent, or Firm* — Ohlandt, Greeley, Ruggiero & Perle, L.L.P.

(57) ABSTRACT

An arrangement is described for measuring performance characteristics of a hands free telephone system. There is a measurement system which is coupleable over a telephone audio interface directly to the hands free telephone system for measuring the performance characteristics.

25 Claims, 5 Drawing Sheets

(56) References Cited

U.S. PATENT DOCUMENTS

| | | | | |
|---|---|---|---|---|
| 2008/0020807 A1* | 1/2008 | Kolano | ............... | H04M 1/24 455/569.1 |
| 2010/0130195 A1* | 5/2010 | Rohaly | ............ | H04W 24/06 455/425 |
| 2011/0064232 A1* | 3/2011 | Ruwisch | ............. | H04M 1/24 381/59 |

FOREIGN PATENT DOCUMENTS

| | | | |
|---|---|---|---|
| JP | 2004282419 | * | 10/2004 |
| JP | 2004282419 A | * | 10/2004 |

OTHER PUBLICATIONS

Written Opinion of the International Searching Authority, PCT/US2010/023261, dated Oct. 20, 2010, 10 pages.

International Preliminary Report on Patentability, PCT/US2010/023261, dated Oct. 20, 2010, 1 page.

Balduin W. et al.: "The VDA Specification for Car Hands-Free: A Step Towards Improved Speech Quality in Car Type Environments" International Telecommunication Union, Nov. 25, 2003, pp. 1-18, XP002601346, Geneva.

EP Application No. 10 705 220.1-1855 Office Action dated Jan. 26, 2016, 4 pages.

Response to European Examination Report dated Jan. 26, 2016 corresponding to European Application No. 10705220.1; Response filed on May 16, 2016; 2 Pages.

European Examination Report dated Mar. 23, 2018 for European Application No. 10705220.1; 4 Pages.

European Intention to Grant dated Oct. 17, 2018 for European Application No. 10705220.1; 27 Pages.

Response (with Amended Claims) to European Communication dated Mar. 23, 2018 for European Application No. 10705220.1; Response filed Aug. 1, 2018; 10 Pages.

* cited by examiner

MEASUREMENT AND TUNING OF HANDS FREE TELEPHONE SYSTEMS

FIELD OF THE INVENTION

The present invention relates to wireless telephone systems, and more specifically to an arrangement for measuring and tuning hands free telephone systems.

BACKGROUND ART

Hands Free Telephone Systems (HFTS) can be used with little or no use of the hands, leaving the user's hands free for other tasks (such as driving). The HFTS is connected to a conventional mobile telephone which in turn is connected to the wireless telephone network. The HFTS may exchange audio signals with the mobile telephone over a wireless connection (e.g. Bluetooth), or alternatively, the telephone device may be snapped into a fixed cradle and get the audio signals over a solid connection (electrical contacts). In some applications, the mobile telephone is represented by a network access device (NAD) which might be integrated together with the hardware for the RIFTS within the same unit.

FIG. 1 shows an example of a typical vehicle application where a vehicle enclosure 100 contains the vehicle's speakers 104 that reproduce the audio of a telephone call and an embedded phone microphone 105 that is placed somewhere in the vehicle enclosure 100 to capture the caller's voice. HFTS 101 is connected to the vehicle speakers 104 and phone microphone 105, and also by a Bluetooth connection to a conventional mobile telephone 102 in the vehicle. The mobile telephone 102 is connected to the wireless telephone network 103 over a digital radio communication link where a radio-frequency (RF) signal is transmitted. The mobile telephone 102 encodes the audio signals for transmission to the telephone network 103 using a speech codec which accomplishes both source coding and channel coding. Various specific speech codecs are available depending on the type of wireless telephone network 103 and its load. Examples of speech codecs include without limitation the enhanced variable rate codec (EVRC) of the CDMA network that is used in North America and the adaptive multirate codec (AMR) and the enhanced full-rate codec (EFR) which are both used for the GSM network in Europe.

Since the HFTS 101 replaces the speaker and microphone of the mobile phone 102, many of the same audio issues arise that conventional mobile phones and land phones have to deal with, for example, echo cancellation and noise suppression. HFTS 101 also incorporates a signal processing unit that in part aims to enhance the signal quality of the system dealing with issues such as disturbances to the microphone signal by background noise, coupling of the loudspeaker output back to the phone microphone 105 (echo component), and other audio interferences. There also might be multiple phone microphones 105 (microphone arrays) and/or multiple vehicle speakers 104, in which case, the signal processing unit might also include multi-channel signal processing such as beam forming and/or multi-channel echo cancellation. Moreover, a phone call made from the vehicle enclosure 100 may have to deal with high levels of ambient noise entering into the call. Thus, any acoustic optimization solution must not only clearly transmit the caller's voice, but also remove these high levels of noise. An overview of the signal processing methods that can be applied within HFTS 101 can be found, for example, in *Acoustic Echo and Noise Control*, E. Hänsler and G. Schmidt, Wiley 2004, incorporated herein by reference.

To approach acoustic optimization of the HFTS 101, a measurement system is used that replaces the actual wireless telephone network 103 with a network simulator that communicates with the mobile telephone 102 over the same interface as the actual network does. The network simulator decodes the encoded speech signal received from the mobile phone 102 and it encodes the return signal sent back to the mobile phone 102 using the codec type and its parameters that are specified by the network. Evaluation of the HFTS 101 is typically based on the VDA standard (Verband der Automobilindustrie e. V. (VDA): VDA Specification for Car Hands-free Terminals, Edition 1.6, November 2008, incorporated herein by reference), which provides a widely recognized specification that aims to ensure a comfortable conversational quality to the user. The VDA standard specifies, for example, the signal levels in the send and receive directions, and the required echo suppression performance.

FIG. 2 shows a typical example of an HFTS measurement arrangement based on using the VDA standard. The HFTS 101 transmits and receives audio signals to and from the mobile phone 102. For a VDA measurement, the actual wireless telephone network is replaced by a network simulator 201 which communicates with the mobile phone 102 over the same interface as the actual network. Measurement system 202 receives the audio signal of the mobile phone 102 from the network simulator 201 and also may generate a return audio signal back through the network simulator 201 to the mobile phone 102. The measurement system 202 also is connected to a special measurement speaker 204 and a measurement microphone 203 which are temporarily placed inside the vehicle for the measurements. The measurement speaker 204 can simulate a local talker (e.g. by a head-and-torso simulator, HATS), and with the measurement microphone 203 the local audio output of the HFTS 101 can be evaluated.

FIG. 2 also shows further details of the HFTS 101 which typically includes an analog-to-digital converter (ADC) 207 that digitizes the incoming analog microphone signal for signal processing unit 210, and a digital-to-analog converter (DAC) 208 that generates an analog speaker output signal, which also may go to an external amplifier 209 before it is output by the vehicle speaker 104. Sample rate converters (SRC) 205 convert the digital data stream to and from the Bluetooth interface 206 to be compatible with the Bluetooth codec that reduces the amount of errors and/or the amount of data. Besides a Bluetooth link as shown in FIG. 2, the connection between the HFTS 101 and the mobile phone 102 can be realized in other specific ways such as Wireless LAN, infrared, hardwire interface where the mobile phone 102 is clamped in a cradle with a plug having electrical contacts. Or, the mobile phone 102 may be integrated into a network access device (NAD) together in the same unit with the hardware for the HFTS 101. The connection between the mobile phone 102 and the network simulator 201 uses a speech codec 211 which performs source coding to reduce the amount of information and channel coding to make the transmission robust to errors. The speech codec 211 loses signal information and thus reduces the quality of the speech signal.

The VDA standard specifies that the HFTS audio signals are analyzed after transmission over a simulated network as described above. Thus, standard state-of-the-art measurement systems require expensive hardware (in particular the network simulator). In addition, those measurement standards evaluate only the signals that are observable on the far-end side (audio signals to/from the network simulator) and on the near-end side (audio signals within the car enclosure). But these signals give only limited insight into the behavior of the hands-free telephone system, as the behavior of the mobile telephone also is included.

SUMMARY OF THE INVENTION

Embodiments of the present invention are directed to measuring performance characteristics of a hands free telephone system. There is a measurement system which is coupleable over a telephone audio interface directly to the hands free telephone system for measuring the performance characteristics.

In some embodiments, the measurement system may include a mobile phone simulation module for simulating operation of a mobile phone interaction with the hands free telephone system over the telephone audio interface and/or a telephone network simulation module for simulating operation of a wireless telephone network interaction with the hands free telephone system over the telephone audio interface. There also may be a simulation model database containing simulation models representing different specific telephone and/or network components (different devices, different types of connections and networks—e.g., Bluetooth, TCP/IP, etc.) which are selectable for use by the measurement system.

Some embodiments may also have a modification module coupleable over the telephone audio interface for modifying operating parameters of the hands free telephone system. The measurement system and the modification module may operate iteratively to optimize the performance characteristics, and the iterations may be controllable either manually and/or by software. And the iterations may be based on changing between different simulation models for specific network components. In some specific embodiments, the iterations may be performed without disruption to the interface connection between the measurement system and the hands free telephone system.

Embodiments of the present invention also include a corresponding method for measuring performance characteristics of a hands free telephone system. The performance characteristics are measured with a measurement system implemented as computer processes functioning in a computer processor and coupled directly over a telephone audio interface to the hands free telephone system, for example, using Bluetooth or TCP/IP.

In further such embodiments, measuring the performance characteristics may include using a mobile phone simulation module to simulate operation of a mobile phone interaction with the hands free telephone system over the telephone audio interface and/or using a telephone network simulation module to simulate operation of a wireless telephone network interaction with the hands free telephone system over the telephone audio interface. Simulation models may be provided that represent specific network components which are selectable for use by the measurement system.

A modification module may be coupled over the telephone audio interface to modify operating parameters of the hands free telephone system. The measurement system and the modification module may operate iteratively to optimize the performance characteristics, and the iterations may be controlled manually or by software. The iterations may be based on changing between different simulation models for specific network components. The iterations may be performed without disruption to the interface connection between the measurement system and the hands free telephone system.

Embodiments of the present invention also include a computer program product implemented in a computer readable storage medium for measuring performance characteristics of a hands free telephone system. The product includes program code for measuring the performance characteristics with a measurement system coupled directly over a telephone audio interface to the hands free telephone system.

DETAILED DESCRIPTION OF SPECIFIC EMBODIMENTS

Embodiments of the present invention are directed to measuring performance characteristics of a hands free telephone system. The signals are not picked up after the network simulator as in the prior art, but instead embodiments of the present invention measure the signals that are communicated between the hands-free telephone system and the mobile telephone. Instead of an actual mobile phone, a calibrated audio device with the same interface is used.

Figure 1:
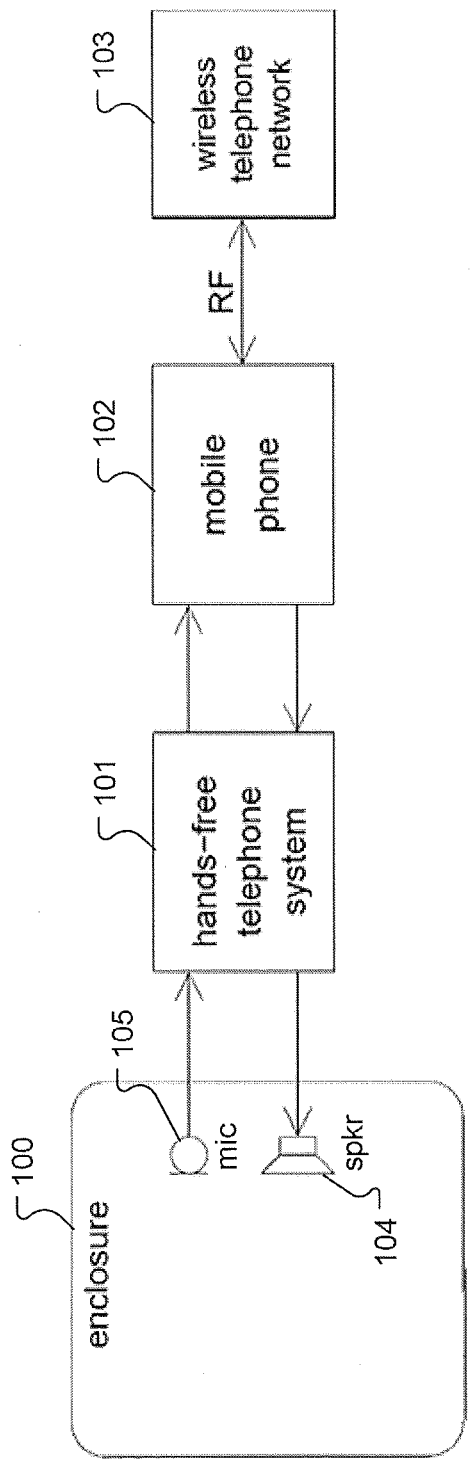
FIG. 1 shows an example of a typical vehicle application of an HFTS.
Figure 2:
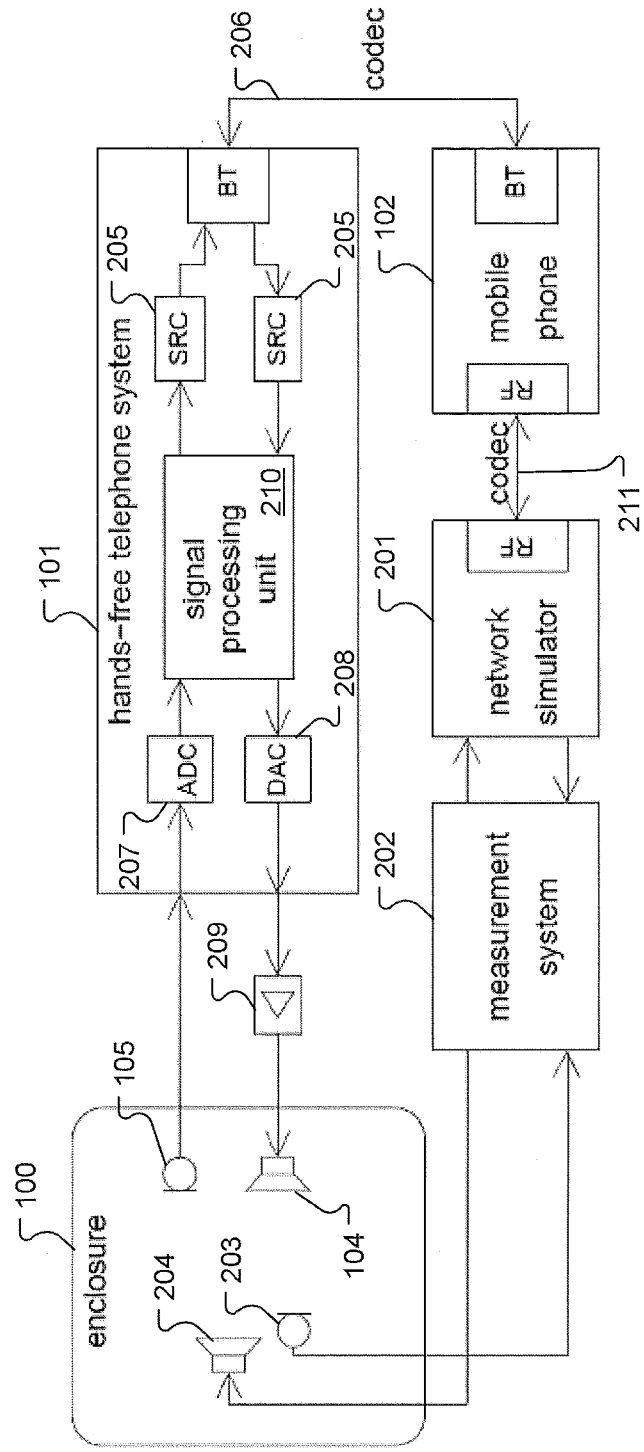
FIG. 2 shows a typical example of an HFTS measurement arrangement.
Figure 3:
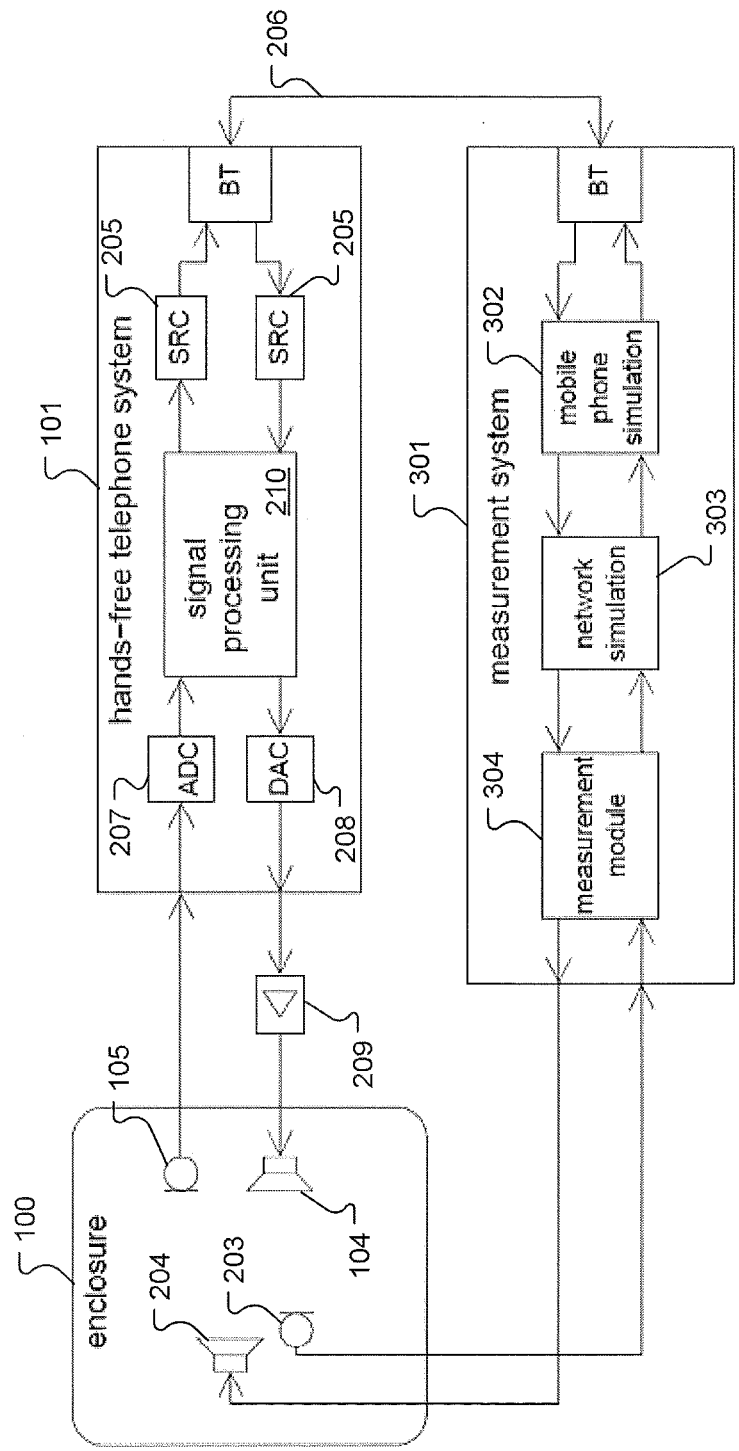
FIG. 3 shows an embodiment where a measurement system is coupled over a telephone audio interface directly to the hands free telephone system.

FIG. 3 shows an example of a typical embodiment where a measurement system 301 is coupled over a telephone audio interface 206 directly to the hands free telephone system HFTS 101 for measuring the performance characteristics of the HFTS. In the example in FIG. 3, the telephone audio interface 206 specifically is a bi-directional Bluetooth link between the HFTS 101 and the measurement system 301.

The core of the measurement system 301 is a measurement module 304 that controls and evaluates the different measurements of the operating parameters of the HFTS 101. The measurement module 304 controls the measurement microphone 203 and the measurement speaker 204 within the vehicle enclosure 100 (simulation of the near-end speaker e.g. by a head-and-torso simulator) much as in prior systems. But, for measuring and controlling the far-end side, the measurement system 301 gets much closer to the HFTS 101—whereas prior measurement systems accessed the audio interface of the network simulator, here the measurement system 301 directly accesses the output signal of the HFTS 101 over the Bluetooth audio interface 206.

Within the measurement system 301, the mobile phone is modeled by a mobile phone simulation module 302 that simulates the operation of a mobile phone interaction with the HFTS 101 over the telephone audio interface 206. The mobile phone simulation module 302 may include a gain factor and/or a frequency response and/or a delay and/or additional signal processing. Telephone network simulation module 303 models the wireless telephone network within the measurement system 301 by simulating operation of a wireless telephone network interaction with the HFTS 101 over the telephone audio interface 206. For example, telephone network simulation module 303 may specifically model a bit error rate of the channel and/or may include the application of a speech codec.

Figure 4:
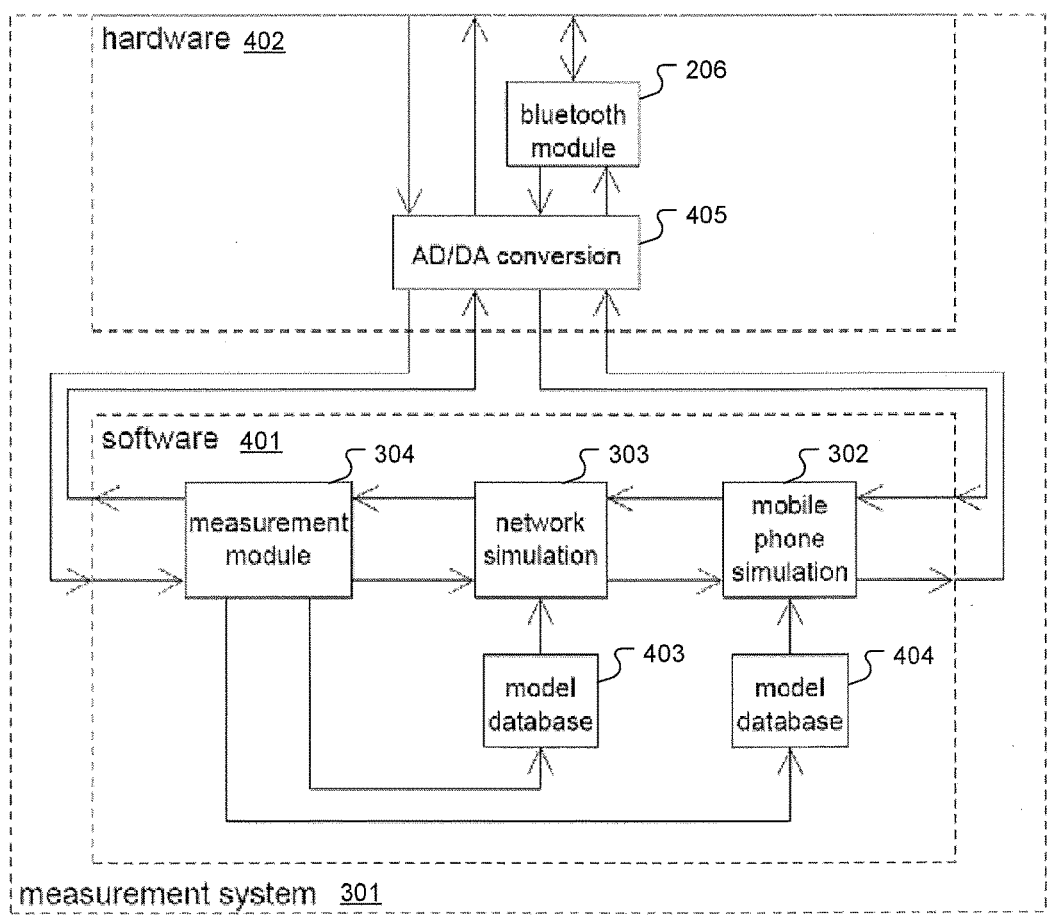
FIG. 4 shows further details of a measurement system partitioned into software and hardware.

FIG. 4 shows further details of such a measurement system 301 partitioned into software 401 and hardware 402. A device simulation model database 404 contains multiple simulation models representing different specific network devices—e.g., Nokia, Samsung, etc.—which are selectable for use by the measurement system 301 with the mobile phone simulation module 302. Similarly, a network simulation model database 403 contains multiple simulation models representing different specific wireless telephone network connections—e.g., Bluetooth, TCP/IP, CDMA, GSM, 3G, 4G, etc.—which are selectable for use by the measurement system 301 with the telephone network simulation module 303. The hardware 402 (e.g., a sound card) performs analogue-to-digital (ADC) and digital-to-analogue (DAC) conversion 405. The lower side the hardware 402 may be connected over a digital interface to the software 401 part of the measurement system 301, while on the upper side, the hardware 402 may be connected over an analogue interface to the measurement speaker 204 and the measurement microphone 203 within the vehicle enclosure 100 and to a Bluetooth module which forms the telephone audio interface 206. Alternatively, the telephone audio interface 206 can also be connected directly to the digital signals. The Bluetooth module telephone audio interface 206 is connected over a radio link to the HFTS 101.

Figure 5:
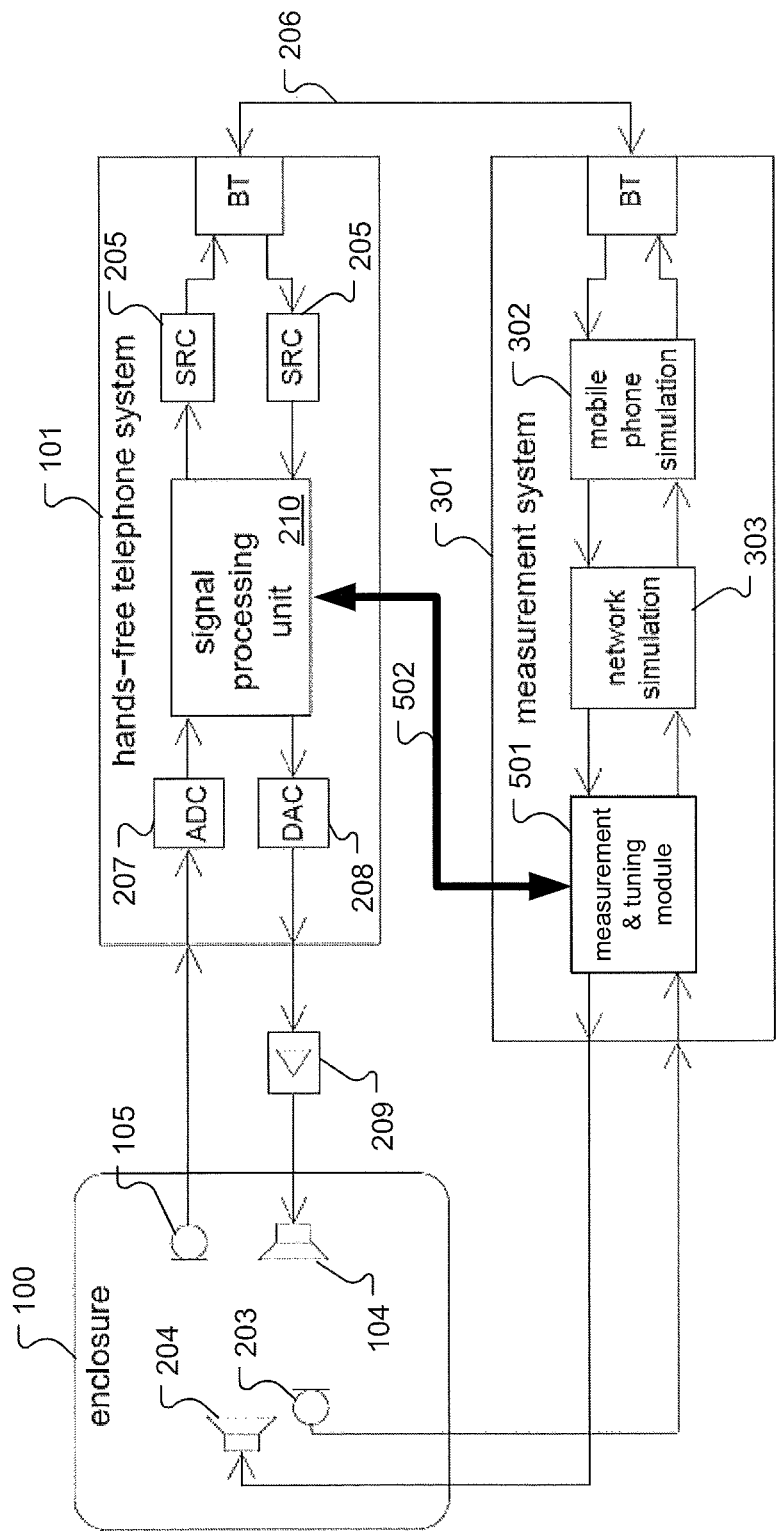
FIG. 5 shows an embodiment where a measurement system includes a tuning component.

FIG. 5 shows another embodiment wherein the measurement system 301 includes a measurement and tuning module 501 for modifying operating parameters of the signal processing unit 210 in the HFTS 101 over tuning path 502 based on analysis of the measurements that are made. Typically, the measurement and tuning module 501 operates iteratively to alternate between a measurement mode and a tuning/modification mode to optimize the performance characteristics of the HFTS 101, preferably without disruption to the connection over the telephone audio interface 206 between the measurement system 301 and the HFTS 101. For example, the iterations may be based on changing between different simulation models for specific network components (e.g., from simulation model database 403 and/or 404). Usefully, the iterations of the measurement and tuning module 501 may be controllable either manually and/or by software.

In an embodiment such as the one shown in FIG. 5, the tasks of measurement and tuning the operating parameters of the HFTS 101 is combined in a single arrangement that operates iteratively in two different steps: (1) evaluate the system is with one ore more measurements (e.g. tests according to the VDA standard), and (2) the modify operating parameters of the HFTS 101 to improve performance compared to the measurements. This arrangement stands in sharp contrast to the prior art where two different software applications are needed to measure the system (step 1) and then to modify the operating parameters (step 2). Moreover, the VDA testing according to the prior art uses professional products that do not allow tuning for a specific HFTS. Thus, whereas previously the iterative measurement and tuning procedure was a slow manual process, now embodiments of the present invention allow a new automatic iterative measurement and tuning procedure where the operating parameters of the HFTS 101 are quickly and easily adjusted as often as needed until the measurement results reach an optimum.

Typically an HFTS 101 might include a debug interface that allows to parameters to be modified from outside by an external software application (e.g., the measurement system 301). This process can be specific to various different devices so that the parameter settings are best suited for covering a number of different phones. To modify the operating parameters of the HFTS 101, the measurement system 301 exchanges data with it, for example, over a serial interface, Ethernet connection (TCP/IP), or an existing Bluetooth connection—either using a different Bluetooth profile or using the same profile and sending special audio signals to the HFTS 101 which it can interpret. For example, the measurement system 301 can play DTMF tones which are detected by the HFTS 101, and the HFTS 101 then reacts depending on the series of DTMF tones. The measurement and tuning module 501 of the measurement system 301 may be a generic one that is adapted to the telephone audio interface 206 of various different HFTS 101 using specific software plug-ins for tuning.

The benefits of such embodiments include greatly reduced hardware costs for the measurement setup, particularly, the expensive separate network simulator device is now obsolete. In addition, the system is convenient to transport and much simpler to setup than a full VDA measurement system as in the prior art, resulting in greater flexibility for on site support. Moreover, in conventional VDA measurement a real mobile telephone has to be used. These telephones each have specific individual behaviors so the result of a measurement depends on the type of telephone and the specific telephone device, and tests with different mobile telephones each require their own separate telephone and to establish a new call. On the other hand, embodiments of the present invention do not need or use an actual telephone for measuring the system since the telephone and the wireless network can both be simulated within the measurement system. And if simulation models for several mobile telephones are available, then no additional effort has to be spent to setup new calls. A series of different phones can be measured in a minimum of time. This simplifies tuning the HFTS for different phone types.

The measurement system of embodiments such as those described above also get the input signals closer to the hands-free telephone system no manipulation by a telephone and no transmission over a network is used. For transmission of the audio signals over the network, the audio signals would be coded and decoded by a speech codec which loses information and thereby loses signal quality. Within the simulation modules of specific embodiments of the present invention, different specific codecs can be applied to simulate a specific network.

But the described embodiments of the present invention measurement system and its setup are not standardized. And only a portion of the signal transmission channels is represented by real devices with the remaining parts being simulated, so the results could potentially be further away from actual conditions than with a conventional VDA setup. However, the network simulator of the conventional VDA arrangement also is simulated and not the actual system (no internal signal processing and no network transitions are simulated). In the end, use of simulation modules as described above offers the potential for adequately realistic modeling.

Embodiments of the invention may be implemented in whole or in part in any conventional computer programming language. For example, preferred embodiments may be implemented in a procedural programming language (e.g., "C") or an object oriented programming language (e.g., "C++", Python). Alternative embodiments of the invention may be implemented as pre-programmed hardware elements, other related components, or as a combination of hardware and software components.

Embodiments can be implemented in whole or in part as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and maybe transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. An arrangement for measuring performance characteristics of a hands free telephone system, the arrangement comprising:
    a measurement system that controls a measurement microphone and a measurement speaker within a vehicle enclosure which has an enclosure microphone and an enclosure loudspeaker, wherein the measurement system is directly coupleable to the hands free telephone system over a telephone audio interface for measuring the performance characteristics,
    wherein the measurement system includes a mobile phone simulation module for simulating operation of a mobile phone interaction with the hands free telephone system over the telephone audio interface.

2. An arrangement according to claim 1, wherein the measurement system includes a telephone network simulation module for simulating operation of a wireless telephone network interaction with the hands free telephone system over the telephone audio interface.

3. An arrangement according to claim 1, further comprising:
    a simulation model database containing a plurality of simulation models representing specific network components which are selectable for use by the measurement system with the mobile phone simulation module.

4. An arrangement according to claim 3, further comprising:
    a simulation model database containing a plurality of simulation models representing specific wireless telephone network connections which are selectable for use by the measurement system with the telephone network simulation module.

5. An arrangement according to claim 1, further comprising:
    a modification module coupleable with the hands free telephone system for modifying operating parameters thereof.

6. An arrangement according to claim 5, wherein the measurement system and the modification module operate iteratively to optimize the performance characteristics.

7. An arrangement according to claim 6, wherein iterations are manually controllable.

8. An arrangement according to claim 6, wherein iterations are software controllable.

9. An arrangement according to claim 6, wherein iterations are based on changing between different simulation models for specific network components.

10. An arrangement according to claim 9, wherein the iterations are performed without disruption to the interface connection between the measurement system and the hands free telephone system.

11. An arrangement according to claim 1, wherein the coupling over the telephone audio interface is based on a Bluetooth arrangement.

12. An arrangement according to claim 1, wherein the coupling over the telephone audio interface is based on a TCP/IP arrangement.

13. An arrangement according to claim 1, wherein the measurement system is further configured to tune one or more operating parameters of the hands free telephone system based, at least in part, on the measured performance characteristics.

14. An arrangement according to claim 1, wherein the measurement system measures signals that are communicated between the mobile phone simulation module and the hands free telephone system to measure one or more of the performance characteristics.

15. A method for measuring performance characteristics of a hands free telephone system, the method comprising:
    measuring the performance characteristics with a measurement system implemented as a plurality of computer processes functioning in a computer processor, wherein the measurement system is directly coupled to the hands free telephone system over a telephone audio interface, and
    wherein measuring the performance characteristics includes controlling a measurement microphone and a measurement speaker within a vehicle enclosure which has an enclosure microphone and an enclosure loudspeaker, and using a mobile phone simulation module to simulate operation of a mobile phone interaction with the hands free telephone system over the telephone audio interface.

16. A method according to claim 15, wherein measuring the performance characteristics includes using a telephone network simulation module to simulate operation of a wireless telephone network interaction with the hands free telephone system over the telephone audio interface.

17. A method according to claim 15, further comprising: providing a plurality of simulation models representing specific network components which are selectable for use by the measurement system with the mobile phone simulation module.

18. A method according to claim 15, further comprising: using a modification module to modify operating parameters of the hands free telephone system.

19. A method according to claim 18, wherein the measurement system and the modification module operate iteratively to optimize the performance characteristics.

20. A method according to claim 19, wherein the iterations are manually controllable.

21. A method according to claim 19, wherein the iterations are software controllable.

22. A method according to claim 19, wherein the iterations are based on changing between different simulation models for specific network components.

23. A method according to claim 22, wherein the iterations are performed without disruption to the interface connection between the measurement system and the hands free telephone system.

24. A method according to claim 15, wherein the coupling over the telephone audio interface is based on a Bluetooth arrangement.

25. A non-transitory computer readable storage medium having instructions stored thereon for measuring performance characteristics of a hands free telephone system, such that when the instructions are executed by a processor, the processor performs steps comprising:

measuring the performance characteristics with a measurement system that is directly coupled to the hands free telephone system over a telephone audio interface, wherein measuring the performance characteristics includes controlling a measurement microphone and a measurement speaker within a vehicle enclosure which has an enclosure microphone and an enclosure loudspeaker, and using a mobile phone simulation module to simulate operation of a mobile phone interaction with the hands free telephone system over the telephone audio interface.

* * * * *